(12) United States Patent
Moser

(10) Patent No.: US 12,653,173 B2
(45) Date of Patent: Jun. 16, 2026

(54) WORMER DEVICE

(71) Applicant: Keith Moser, West Chester, PA (US)

(72) Inventor: Keith Moser, West Chester, PA (US)

( * ) Notice: Subject to any disclaimer, the term of this patent is extended or adjusted under 35 U.S.C. 154(b) by 79 days.

(21) Appl. No.: 18/475,384

(22) Filed: Sep. 27, 2023

(65) Prior Publication Data

US 2024/0172736 A1 May 30, 2024

Related U.S. Application Data

(60) Provisional application No. 63/428,678, filed on Nov. 29, 2022.

(51) Int. Cl.
| | |
|---|---|
| *A01K 97/00* | (2006.01) |
| *A01K 99/00* | (2006.01) |
| *A01M 29/22* | (2011.01) |
| *A01M 99/00* | (2006.01) |
| *A01M 1/02* | (2006.01) |

(52) U.S. Cl.
CPC .............. *A01K 97/00* (2013.01); *A01K 99/00* (2013.01); *A01M 29/22* (2013.01); *A01M 1/023* (2013.01)

(58) Field of Classification Search
CPC ....... A01K 97/00; A01K 99/00; A01M 99/00; A01M 29/22; A01M 1/00; A01M 1/023; A01M 2200/011
USPC .......................... 43/1, 4, 132.1, 124; 367/139
See application file for complete search history.

(56) References Cited

U.S. PATENT DOCUMENTS

| | | | | | |
|---|---|---|---|---|---|
| 1,446,914 | A | * | 2/1923 | Lingafelter .......... | A01K 97/045 |
| | | | | | 119/6.7 |
| 1,932,237 | A | * | 10/1933 | Warner .................. | A01M 29/24 |
| | | | | | 47/1.3 |
| 1,953,677 | A | * | 4/1934 | Glover .................. | A01M 29/16 |
| | | | | | 116/22 A |
| 2,450,597 | A | * | 10/1948 | Karnowski ........... | A01M 29/24 |
| | | | | | 231/7 |
| 2,607,164 | A | * | 8/1952 | Fenton .................. | A01K 67/00 |
| | | | | | 47/1.3 |
| 2,770,075 | A | * | 11/1956 | Moore ................... | A01K 67/00 |
| | | | | | 47/1.3 |
| 2,867,055 | A | * | 1/1959 | Lebiedzinski ......... | A01K 67/33 |
| | | | | | 43/55 |
| 3,058,250 | A | * | 10/1962 | Thomas ................. | A01K 97/10 |
| | | | | | 43/17 |
| 3,073,284 | A | * | 1/1963 | Roberts .................. | A01K 67/00 |
| | | | | | 47/1.3 |

(Continued)

FOREIGN PATENT DOCUMENTS

| | | | | | |
|---|---|---|---|---|---|
| CA | 1297937 | C | * | 3/1992 | ......... A01K 67/0332 |
| WO | WO-2010043219 | A2 | * | 4/2010 | ............. A01K 97/00 |

*Primary Examiner* — Darren W Ark

(74) *Attorney, Agent, or Firm* — Brennan, Manna & Diamond, LLC

(57) ABSTRACT

The present invention relates to a novel wormer device. The device utilizes vibration, whether mechanical or sound produced, to drive worms to the surface of the soil for collection. The wormer device comprises a base component with a handle portion and a telescoping metal probe. The base component includes an on/off button in communication with the metal probe, as well as a battery and a vibrating motor or embedded speaker that would generate vibrations down the metal probe into the ground. The vibrations produced by the device will trigger a response by the worms to attract them to the surface of the soil for collection.

1 Claim, 3 Drawing Sheets

(56)                References Cited

U.S. PATENT DOCUMENTS

| | | | | | |
|---|---|---|---|---|---|
| 3,093,761 | A | * | 6/1963 | Case | H02K 33/00 |
| | | | | | 116/22 A |
| 3,239,413 | A | * | 3/1966 | Chaney | A01M 29/12 |
| | | | | | 43/1 |
| 3,517,635 | A | * | 6/1970 | Kuhl | G10K 1/06 |
| | | | | | 116/22 A |
| 3,763,593 | A | * | 10/1973 | Guthrie | A01M 29/24 |
| | | | | | 47/1.3 |
| 3,791,624 | A | * | 2/1974 | Payson | A47G 27/0493 |
| | | | | | 285/298 |
| 3,793,770 | A | * | 2/1974 | Johnson | A01M 17/00 |
| | | | | | 231/7 |
| 3,820,279 | A | * | 6/1974 | Sieper | A01M 29/24 |
| | | | | | 219/127 |
| 3,835,568 | A | * | 9/1974 | Whitfield | A01K 97/10 |
| | | | | | 43/17 |
| 3,898,756 | A | * | 8/1975 | Tolle | A01M 17/00 |
| | | | | | D22/148 |
| 3,973,354 | A | * | 8/1976 | Schommer | A01M 19/00 |
| | | | | | 47/1.3 |
| 4,097,838 | A | * | 6/1978 | Fiala | A01M 29/16 |
| | | | | | 43/124 |
| 4,178,711 | A | * | 12/1979 | Mermal | A01M 29/12 |
| | | | | | 428/326 |
| 4,215,429 | A | * | 7/1980 | Riach | A01M 29/24 |
| | | | | | 116/22 A |
| 4,366,562 | A | * | 12/1982 | McGinty | A01M 29/16 |
| | | | | | 116/22 A |
| 4,414,653 | A | * | 11/1983 | Pettinger | H04B 11/00 |
| | | | | | 367/139 |
| 4,524,533 | A | * | 6/1985 | Still, Jr. | G09F 21/04 |
| | | | | | 40/607.04 |
| 4,556,679 | A | * | 12/1985 | Koehler | A01N 27/00 |
| | | | | | 424/84 |
| 4,570,372 | A | * | 2/1986 | Lukas | A01M 29/12 |
| | | | | | 43/1 |
| 4,630,571 | A | * | 12/1986 | Palmer | A01M 29/24 |
| | | | | | 119/908 |
| 4,635,393 | A | * | 1/1987 | Pfeffer, Sr. | A01M 1/223 |
| | | | | | 43/112 |
| 4,667,436 | A | * | 5/1987 | Benson | A01M 17/00 |
| | | | | | 43/132.1 |
| 4,817,331 | A | * | 4/1989 | Podsiadly | A01K 67/33 |
| | | | | | 47/1.3 |
| 4,934,087 | A | * | 6/1990 | Zanon | A01K 67/33 |
| | | | | | 43/4 |
| 5,146,867 | A | * | 9/1992 | Goldschmidt | A01M 29/30 |
| | | | | | 116/22 A |
| 5,205,066 | A | * | 4/1993 | Jan | A01M 29/16 |
| | | | | | 116/22 A |
| 5,224,438 | A | * | 7/1993 | Buss | A01M 29/22 |
| | | | | | 116/22 A |
| 5,241,777 | A | * | 9/1993 | Looker | A01M 29/16 |
| | | | | | 116/22 A |
| 5,301,633 | A | * | 4/1994 | Lloyd | A01K 67/33 |
| | | | | | 47/79 |
| 5,327,674 | A | * | 7/1994 | Powell | A01M 23/10 |
| | | | | | 43/4 |
| 5,524,375 | A | * | 6/1996 | Morrison | A01N 27/00 |
| | | | | | 43/1 |
| 5,632,115 | A | * | 5/1997 | Heitman | A01M 1/223 |
| | | | | | 43/132.1 |
| 5,685,107 | A | * | 11/1997 | Sweet | A01K 97/10 |
| | | | | | 43/21.2 |
| 5,718,078 | A | * | 2/1998 | Therrien | A01M 1/023 |
| | | | | | 43/107 |
| 5,822,917 | A | * | 10/1998 | Jan | A01M 29/22 |
| | | | | | 116/22 A |
| 5,832,657 | A | * | 11/1998 | Jan | A01M 31/002 |
| | | | | | 116/22 A |
| 5,870,847 | A | * | 2/1999 | Hsiao | A01M 29/16 |
| | | | | | 116/22 A |
| 5,884,579 | A | * | 3/1999 | Slobodian | A01K 67/33 |
| | | | | | 231/7 |
| 6,000,169 | A | * | 12/1999 | Jan | A01M 29/16 |
| | | | | | 43/124 |
| 6,134,827 | A | * | 10/2000 | Jan | A01M 29/16 |
| | | | | | 43/124 |
| 6,157,594 | A | * | 12/2000 | Jan | A01M 29/16 |
| | | | | | 116/22 A |
| 6,618,977 | B1 | * | 9/2003 | Curro | A01M 7/0092 |
| | | | | | 43/1 |
| 7,146,763 | B1 | * | 12/2006 | Stanton | A01K 97/10 |
| | | | | | 114/364 |
| 7,598,879 | B2 | * | 10/2009 | Weiser | A01M 29/16 |
| | | | | | 340/573.2 |
| 7,782,711 | B2 | * | 8/2010 | Fembleaux | A01M 29/16 |
| | | | | | 367/139 |
| 8,755,251 | B1 | * | 6/2014 | Jan | A01M 29/16 |
| | | | | | 367/139 |
| 9,131,670 | B2 | * | 9/2015 | Johnston | A01K 67/33 |
| 11,369,100 | B2 | * | 6/2022 | Dougherty | A01K 97/04 |
| 12,484,568 | B1 | * | 12/2025 | Young | A01M 1/02 |
| 2001/0035201 | A1 | * | 11/2001 | Kuzmic | E04H 12/2215 |
| | | | | | 52/165 |
| 2006/0042156 | A1 | * | 3/2006 | Holland | A01M 29/24 |
| | | | | | 43/132.1 |
| 2008/0156279 | A1 | * | 7/2008 | Weiser | A01M 29/16 |
| | | | | | 119/719 |
| 2022/0131349 | A1 | * | 4/2022 | Harrell | H02G 1/085 |

* cited by examiner

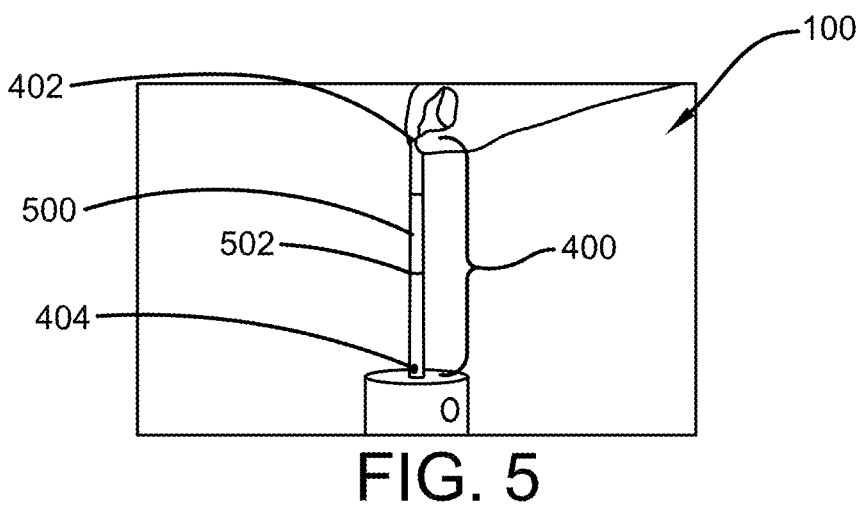

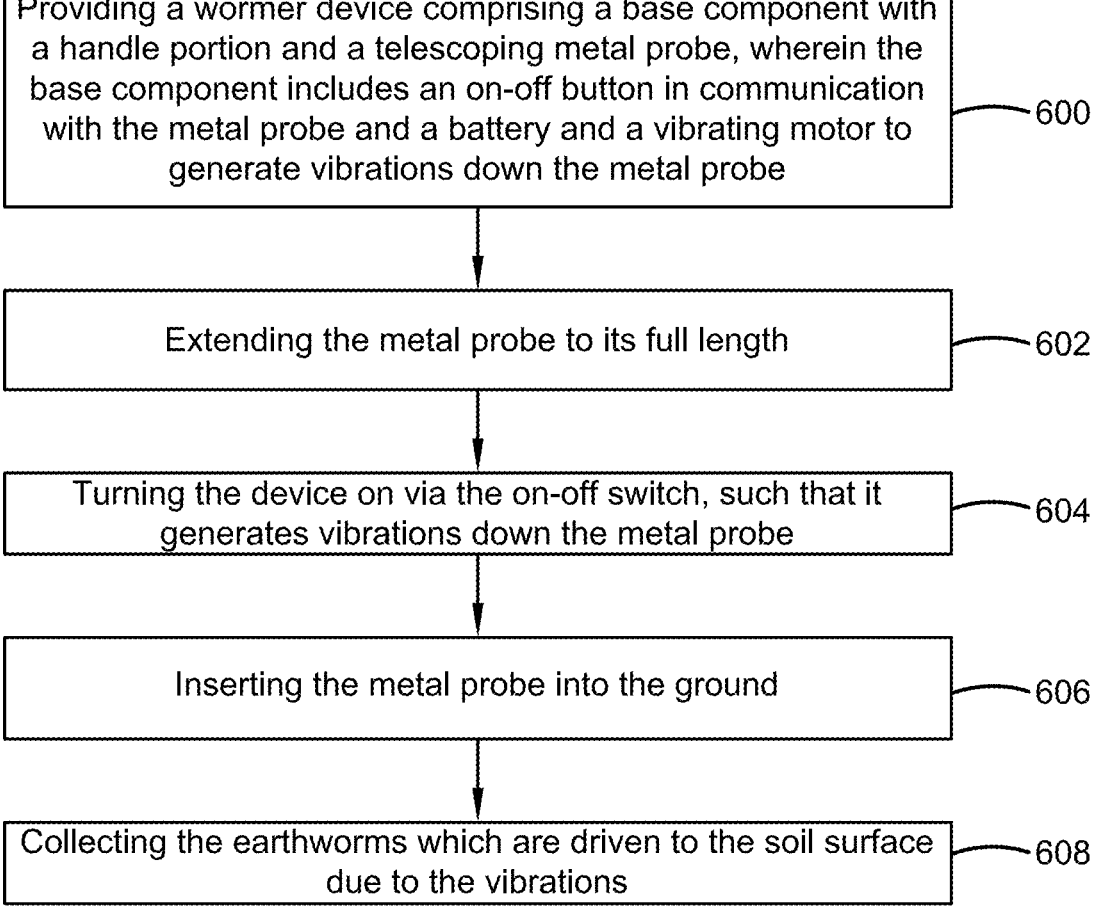

| | |
|---|---|
| Providing a wormer device comprising a base component with a handle portion and a telescoping metal probe, wherein the base component includes an on-off button in communication with the metal probe and a battery and a vibrating motor to generate vibrations down the metal probe | 600 |
| Extending the metal probe to its full length | 602 |
| Turning the device on via the on-off switch, such that it generates vibrations down the metal probe | 604 |
| Inserting the metal probe into the ground | 606 |
| Collecting the earthworms which are driven to the soil surface due to the vibrations | 608 |

FIG. 6

WORMER DEVICE

CROSS-REFERENCE TO RELATED APPLICATION

The present application claims priority to, and the benefit of, U.S. Provisional Application No. 63/428,678, which was filed on Nov. 29, 2022, and is incorporated herein by reference in its entirety.

FIELD OF THE INVENTION

The present invention relates generally to the field of wormer devices. More specifically, the present invention relates to a hand tool capable of producing vibrations to lure earthworms to the soil surface for collection. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in wormer devices. Generally, anglers who enjoy using live bait, like worms, may spend considerable money on their bait. Further, people may try to gather their own worms but lack the tools to do so. Additionally, conventional electric shock probes used to collect worms can be dangerous to operate due to the amount of voltage they require to function.

Earthworms have a number of beneficial uses. The most recognizable is the use of earthworms as bait for sport fishermen. However, fishermen who harvest the earthworms are faced with problems inherent in the harvesting process. One problem in harvesting earthworms is finding earthworms that are on the ground surface and not entirely buried in the soil. This problem is solved typically by manually overturning the soil in which the earthworms reside using a shovel or spade. Accordingly, an easier and more efficient means for collecting worms is needed.

Therefore, there exists a long-felt need in the art for a wormer device that provides users with a hand tool capable of producing vibrations to lure earthworms to the soil surface for collection. There is also a long-felt need in the art for a wormer device that allows users to produce mechanical or sound-based vibrations that help drive worms to the surface. Further, there is a long-felt need in the art for a wormer device that includes a telescopic six-inch metal probe that is inserted into the ground to produce the vibrations. Moreover, there is a long-felt need in the art for a device that offers a way for anglers, gardeners, and others to easily collect worms for various purposes. Further, there is a long-felt need in the art for a wormer device that includes a handle with an on/off button, as well as space for a battery and a motor. Finally, there is a long-felt need in the art for a wormer device that can be folded for easy transport and storage.

The subject matter disclosed and claimed herein, in one embodiment thereof, comprises a wormer device. The device utilizes vibration, whether mechanical or sound produced, to drive worms to the surface of the soil for collection. The wormer device comprises a base component with a handle portion and a telescoping metal probe. The base component includes an on/off button in communication with the metal probe, as well as a battery and a vibrating motor or embedded speaker that would generate vibrations down the metal probe into the ground. The vibrations produced by the device will trigger a response by the worms to attract them to the surface of the soil for collection. Further, the device can be folded for easy storage inside a tackle box and can comprise a handle for convenient carrying and transportation.

In this manner, the wormer device of the present invention accomplishes all of the foregoing objectives and provides users with a device that provides a tool for driving earthworms to the soil surface for collection. The device produces mechanical or sound-based vibrations that help drive the worms to the surface. The device can be folded for easy transport and storage.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a wormer device. The device utilizes vibration, whether mechanical or sound produced, to drive worms to the surface of the soil for collection. The wormer device comprises a base component with a handle portion and a telescoping metal probe. The vibrations produced by the device will trigger a response by the worms to attract them to the surface of the soil for collection.

In one embodiment, the wormer device comprises a base component. The base component is constructed of a rigid material that is shaped to fit into the user's hand and includes a handle portion for convenient carrying and transportation. The handle portion may be formed of various materials and may be formed into various shapes, as well as include ergonomic tread, ridges, or other surface markings. Further, the handle may also include ridges or indentations that conform to the shape of the user's fingers.

In one embodiment, the base component is cylindrical or oval in shape, but can be any suitable size and shape as is known in the art, as long as the base component is shaped to retain the probe in a retracted position, as well as the battery and motor/speaker. Generally, the base component comprises a first end which contains the handle portion and a second end which is secured to a telescoping probe.

In one embodiment, the base component has an aperture or battery containment area which is formed to accept a battery. The preferred embodiment uses a standard 9-volt battery, and the battery containment area is shaped to accept that size battery. Of course, depending upon the specifications of a particular user, the size and shape of the battery and containment area may vary. The battery containment area also includes electrical contacts, one negative and one positive, permanently placed to accept the terminals of the battery when the battery is properly placed in the battery containment area.

In one embodiment, the base component also comprises a vibrating motor in communication with the battery. The vibrating motor can be any suitable vibrating motor as is known in the art, as long as the motor produces vibrations when turned on. The vibrations produced by the motor travel down the metal probe into the surrounding soil and trigger a response from the worms to attract them to the surface of the soil for collection.

In another embodiment, the base component comprises an embedded speaker instead of a motor. The embedded speaker is in communication with the battery and would also generate vibrations. Any suitable speaker as is known in the art can be used, as long as the speaker produces vibrations when turned on. The vibrations produced by the speaker travel down the metal probe into the surrounding soil and trigger a response from the worms to attract them to the surface of the soil for collection.

In another embodiment, the base component comprises a power switch, or on/off switch, that is in communication with the motor or speaker. Once depressed, the power switch turns on the motor or speaker. In some embodiments, the power switch can be set to automatically power down or shut off after a predetermined period of time. In other embodiments, the power switch must be manually turned on and off, as needed.

In one embodiment, the base component is manufactured of plastic, polycarbonate, polyurethane, polyethylene, metal, aluminum, stainless, steel, etc., or any other suitable material as is known in the art. Further, the base component is also manufactured from a material that is water resistant or waterproof, or the base component comprises a coating that is water resistant or waterproof.

Preferably, the handle portion is equipped with a clamp or an aperture to attach a flashlight to the handle portion so that the device may be used during periods of low light or at night. One skilled in the art would be familiar with various means with which to attach a light source to the handle portion so that the area immediately adjacent to the base component would be illuminated.

In one embodiment, the base component comprises a telescoping metal probe or rod. The probe can be retracted into the base component for storage. During use, the probe is extended out to approximately six inches to eight inches in length. The probe can be any suitable length as is known in the art, depending on the wants and/or needs of a user. Once extended out, the probe comprises an elongated vertical portion having a lower end tip portion adapted for inserting into the ground. To enable easy insertion of the probe into the ground, a user grasps the handle portion and thrusts the probe into the soil.

In one embodiment, the base component is secured to the metal probe via any suitable securing means as is known in the art, such as a pin connection, threads, ultrasonic welding, gluing, adhesives, etc.

Further, in this embodiment, the probe is a telescoping probe and comprises at least one telescoping segment that allows the total length of the probe to be extended or retracted. Each telescoping segment is hollow and has a slip lock for locking the segment at a specific length. Further, the slip lock is released by means of pressing or turning the slip lock. The at least one telescoping segment allows the probe to have a length from approximately six inches to eight inches fully extended, allowing a user to set the probe at a desired height. Thus, the probe can be fully retracted into the base component or can be adjusted to a length of approximately eight inches, if needed. Any type of telescoping locks, such as a clutch lock, cam lock, spring button, snap lock, set knob, or any other suitable lock as is known in the art, can be used for securing a desired length of the telescoping segments and for securing the telescoping segments to each other, during extension and retraction of the telescoping segments of the probe.

In one embodiment, the telescoping probe can be retracted completely into the base component for storage and transportation. The retractability of the probe allows the wormer device to be easily stored in a tackle box or other small space for future use.

In one embodiment, the probe is manufactured of metal, such as aluminum, stainless steel, high carbon steel, galvanized aluminum, etc., or any other suitable metal as is known in the art.

In use, the telescoping probe is extended to its full length and the power button is pressed on. Powering the device causes the motor or speaker to produce vibrations which travel down the metal probe into the soil. The telescoping probe is then inserted into the ground. The vibrations within the soil create vibrations in the ground adjacent to the metal probe end tip portion, thereby causing worms in that locality to come to the surface of the ground where they can readily be collected.

In yet another embodiment, the wormer device comprises a plurality of indicia.

In yet another embodiment, a method of driving earthworms to the soil surface for collection is disclosed. The method includes the steps of providing a wormer device comprising a base component with a handle portion and a telescoping metal probe, wherein the base component includes an on/off button in communication with the metal probe and a battery and a vibrating motor or embedded speaker to generate vibrations down the metal probe. The method also comprises extending the metal probe to its full length. Further, the method comprises turning the device on via the on/off switch, such that it generates vibrations down the metal probe. The method also comprises inserting the metal probe into the ground. Finally, the method comprises collecting earthworms which are driven to the soil surface due to the vibrations.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which:

FIG. 5 illustrates a perspective view of one embodiment of the wormer device of the present invention showing the probe fully extended in accordance with the disclosed architecture; and FIG. 6 illustrates a flowchart showing the method of driving earthworms to the soil surface for collection in accordance with the disclosed architecture.

DETAILED DESCRIPTION OF THE PRESENT INVENTION

Figure 1:
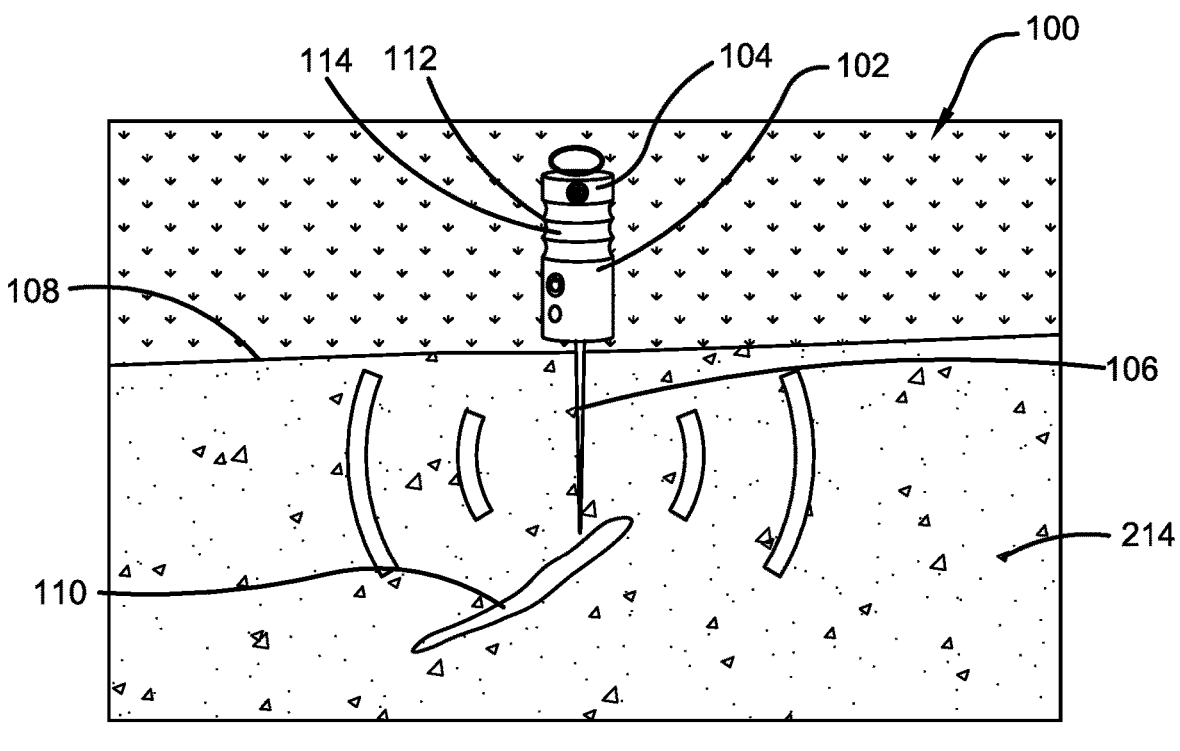
FIG. 1 illustrates a perspective view of one embodiment of the wormer device of the present invention in use in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a wormer device that provides users with a hand tool capable of producing vibrations to lure earthworms to the soil surface for collection. There is also a long-felt need in the art for a wormer device that allows users to produce mechanical or sound-based vibrations that help drive worms to the surface. Further, there is a long-felt need in the art for a wormer device that includes a telescopic six-inch metal probe that is inserted into the ground to produce the vibrations. Moreover, there is a long-felt need in the art for a device that offers a way for anglers, gardeners, and others to easily collect worms for various purposes. Further, there is a long-felt need in the art for a wormer device that includes a handle with an on/off button, as well as space for a battery and a motor. Finally, there is a long-felt need in the art for a wormer device that can be folded for easy transport and storage.

The present invention, in one exemplary embodiment, is a novel wormer device. The device utilizes vibration, whether mechanical or sound produced, to drive worms to the surface of the soil for collection. The wormer device comprises a base component with a handle portion and a telescoping metal probe. The base component includes an on/off button in communication with the metal probe, as well as a battery and a vibrating motor or embedded speaker that would generate vibrations down the metal probe into the ground. The vibrations produced by the device will trigger a response by the worms to attract them to the surface of the soil for collection. The present invention also includes a novel method of driving earthworms to the soil surface for collection. The method includes the steps of providing a wormer device comprising a base component with a handle portion and a telescoping metal probe, wherein the base component includes an on/off button in communication with the metal probe and a battery and a vibrating motor or embedded speaker to generate vibrations down the metal probe. The method also comprises extending the metal probe to its full length. Further, the method comprises turning the device on via the on/off switch, such that it generates vibrations down the metal probe. The method also comprises inserting the metal probe into the ground. Finally, the method comprises collecting earthworms which are lured to the soil surface due to the vibrations.

Referring initially to the drawings, FIG. 1 illustrates a perspective view of one embodiment of the wormer device 100 of the present invention. In the present embodiment, the wormer device 100 is an improved wormer device 100 that produces vibrations to drive earthworms to the soil surface 108 for collection. Further, the device 100 is a hand tool capable of producing mechanical or sound-based vibrations. Specifically, the wormer device 100 comprises a base component 102 with a handle portion 104 and a telescopic metal probe 106. The vibrations produced by the device 100 will trigger a response by the worms 110 to attract them to the surface 108 of the soil for collection. Thus, the device 100 offers a way for users to easily collect worms 110 for various purposes.

Furthermore, the wormer device 100 comprises a base component 102. The base component 102 is constructed of a rigid material that is shaped to fit into the user's hand and includes a handle portion 104 for convenient carrying and transportation. The handle portion 104 may be formed of various materials and may be formed into various sizes and shapes, as well as include ergonomic tread, ridges, or other surface markings 112. Further, the handle portion 104 may also include ridges or indentations 114 that conform to the shape of the user's fingers 116.

Figure 2:
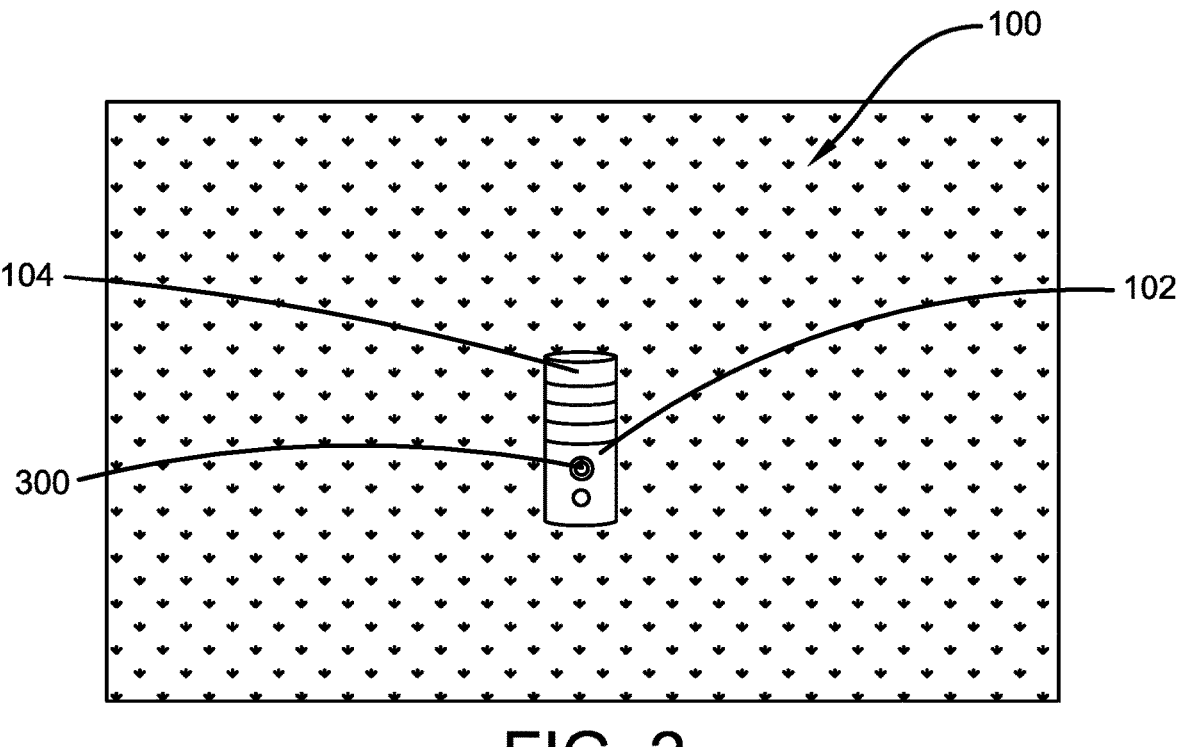
FIG. 2 illustrates a perspective view of one embodiment of the wormer device of the present invention showing the device inserted into the ground in accordance with the disclosed architecture.

As shown in FIG. 2, the base component 102 is cylindrical or oval in shape but can be any suitable size and shape as is known in the art, as long as the base component 102 is shaped to retain the probe 106 in a retracted position, as well as a battery 200 and motor 202/speaker 204. Generally, the base component 102 comprises a first end 206 which contains the handle portion 104 and a second end 208 which is secured to a telescoping probe 106.

Further, the base component 102 has an aperture or battery containment area 210 which is formed to accept a battery 200. In one embodiment, the device 100 uses a standard 9-volt battery 200 and the battery containment area 210 is shaped to accept that size battery 200. Of course, depending upon the specifications of a particular user, the size and shape of the battery 200 and containment area 210 may vary. The battery containment area 210 also includes electrical contacts 212, one negative and one positive, permanently placed to accept the terminals of the battery 200 when the battery 200 is properly placed in the battery containment area 210.

In one embodiment, the base component 102 also comprises a vibrating motor 202 in communication with the battery 200. The vibrating motor 202 can be any suitable vibrating motor 202 as is known in the art, as long as the motor 202 produces vibrations when turned on. The vibrations produced by the motor 202 travel down the metal probe 106 into the surrounding soil 214 and trigger a response from the worms 110 to attract them to the surface 108 of the soil for collection.

In another embodiment, the base component 102 comprises an embedded speaker 204 instead of a motor 202. The embedded speaker 204 is in communication with the battery 200 and would also generate vibrations. Any suitable speaker 204 as is known in the art can be used, as long as the speaker 204 produces vibrations when turned on. The vibrations produced by the speaker 204 travel down the metal probe 106 into the surrounding soil 214 and trigger a response from the worms 110 to attract them to the surface 108 of the soil for collection.

Figures 3, 4:
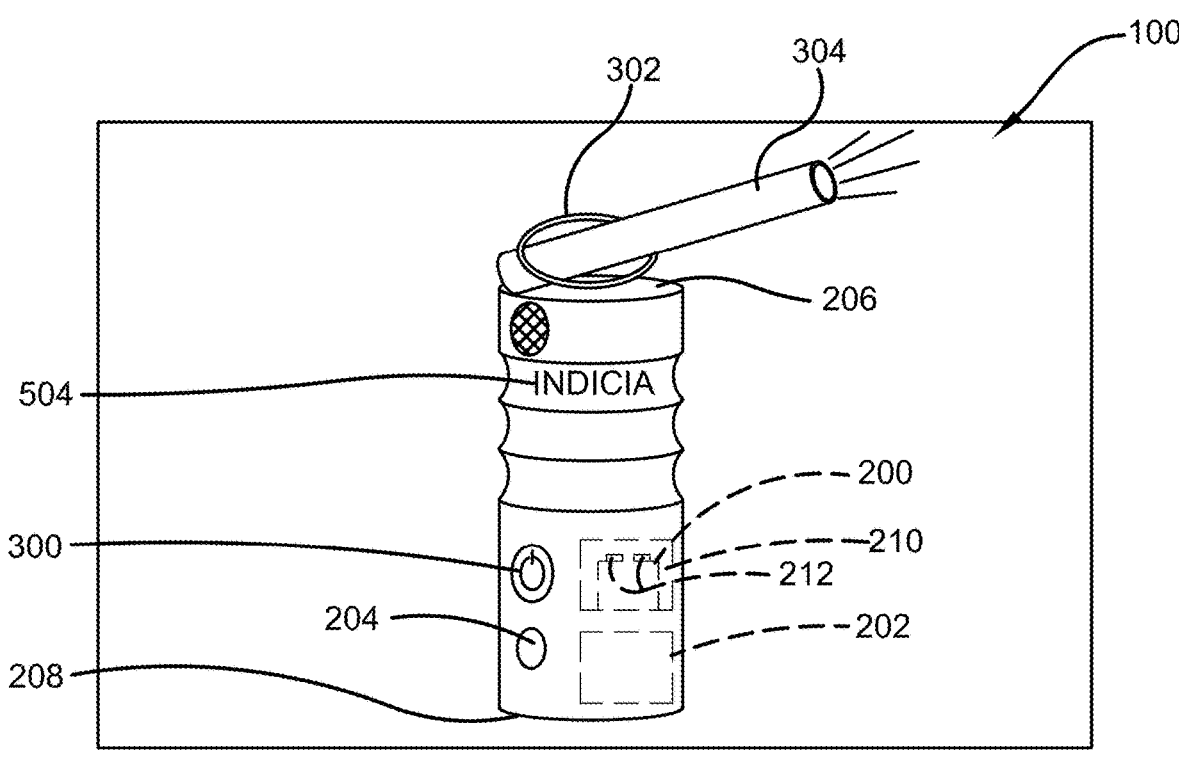
FIG. 3 illustrates a perspective view of one embodiment of the wormer device of the present invention showing the handle portion in accordance with the disclosed architecture.
FIG. 4 illustrates a perspective view of one embodiment of the wormer device of the present invention showing how the device can be activated in accordance with the disclosed architecture.

As shown in FIG. 3, the base component 102 comprises a power switch 300, or on/off switch, that is in communication with the motor 202 or speaker 204. Once depressed, the power switch 300 turns on the motor 202 or speaker 204. In some embodiments, the power switch 300 can be set to automatically power down or shut off after a predetermined period of time. In other embodiments, the power switch 300 must be manually turned on and off, as needed.

Furthermore, the base component 102 is manufactured of plastics, such as, polycarbonate, polyurethane, polyethylene, or metals, such as, aluminum, stainless, steel, etc., or any other suitable material as is known in the art. Further, the base component 102 is also manufactured from a material that is water resistant or waterproof, or the base component 102 comprises a coating that is water resistant or waterproof.

Preferably, the handle portion 104 is equipped with a clamp 302 or an aperture to attach a flashlight 304 to the handle portion 104 so that the device 100 may be used during periods of low light or at night. One skilled in the art would be familiar with various means with which to attach a light source to the handle portion 104 so that the area immediately adjacent to the base component 102 would be illuminated.

As shown in FIG. 4, the base component 102 comprises a telescoping metal probe 106 or rod. The probe 106 can be retracted into the base component 102 for storage. During use, the probe 106 is extended out to approximately six inches to eight inches in length. The probe 106 can be any suitable length as is known in the art, depending on the wants and/or needs of a user. Once extended out, the probe 106 comprises an elongated vertical portion 400 having a lower end tip portion 402 adapted for inserting into the ground 214. To enable easy insertion of the probe 106 into the ground 214, a user grasps the handle portion 104 and thrusts the probe 106 into the soil 214.

Generally, the base component 102 is secured to the metal probe 106 via any suitable securing means as is known in the art, such as a pin connection 404, threads, ultrasonic welding, gluing, adhesives, etc.

Furthermore, the telescoping probe 106 can be retracted completely into the base component 102 for storage and transportation. The retractability of the probe 106 allows the wormer device 100 to be easily stored in a tackle box or other small space for future use.

Additionally, the probe 106 is manufactured of metal, such as aluminum, stainless steel, high carbon steel, galvanized aluminum, etc., or any other suitable metal as is known in the art to transmit the vibrations into the ground 214.

As shown in FIG. 5, the probe 106 is a telescoping probe (though it can also be of fixed length (i.e., not telescoping)) and comprises at least one telescoping segment 500 that allows the total length of the probe 106 to be extended or retracted. Each telescoping segment 500 is hollow and has a slip lock 502 for locking the segment 500 at a specific length. Further, the slip lock 502 is released by means of pressing or turning the slip lock 502. The at least one telescoping segment 500 allows the probe 106 to have a length from approximately six inches to eight inches fully extended, allowing a user to set the probe 106 at a desired length. However, the probe 106 can be any suitable length as is known in the art, depending on the needs and/or wants of a user. Thus, the probe 106 can be fully retracted into the base component 102 or can be adjusted to a length of approximately eight inches, if needed. Any type of telescoping locks, such as a clutch lock, cam lock, spring button, snap lock, set knob, or any other suitable lock as is known in the art, can be used for securing a desired length of the telescoping segments 500 and for securing the telescoping segments 500 to each other during extension and retraction of the telescoping segments 500 of the probe 106.

In use, the telescoping probe 106 is extended to its full length and the power button 300 is pressed on. Powering the device 100 causes the motor 202 or speaker 204 to produce vibrations which travel down the metal probe 106 into the soil 214. The telescoping probe 106 is then inserted into the ground 214. The vibrations within the soil 214 create vibrations in the ground 214 adjacent to the metal probe end tip portion 402, thereby causing worms 110 in that locality to come to the surface 108 of the ground where they can readily be collected.

Furthermore, the wormer device 100 comprises a plurality of indicia 504. The base component 102 of the device 100 may include advertising, trademark, or other letters, designs, or characters, printed, painted, stamped, or integrated into the base component 102, or any other indicia 504 as is known in the art. Specifically, any suitable indicia 504 as is known in the art can be included, such as, but not limited to, patterns, logos, emblems, images, symbols, designs, letters, words, characters, animals, advertisements, brands, etc., that may or may not be fishing, bait, or brand related.

FIG. 6 illustrates a flowchart of the method of driving earthworms to the soil surface for collection. The method includes the steps of at 600, providing a wormer device comprising a base component with a handle portion and a telescoping metal probe, wherein the base component includes an on/off button in communication with the metal probe and a battery and a vibrating motor or embedded speaker to generate vibrations down the metal probe. The method also comprises at 602, extending the metal probe to its full length. Further, the method comprises at 604, turning the device on via the on/off switch, such that it generates vibrations down the metal probe. The method also comprises at 606, inserting the metal probe into the ground. Finally, the method comprises at 608, collecting earthworms which are driven to the soil surface due to the vibrations.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "wormer device" and "device" are interchangeable and refer to the wormer device 100 of the present invention.

Notwithstanding the foregoing, the wormer device 100 of the present invention can be of any suitable size and configuration as is known in the art without affecting the overall concept of the invention, provided that it accomplishes the above-stated objectives. One of ordinary skill in the art will appreciate that the wormer device 100 as shown in FIGS. 1-6 are for illustrative purposes only, and that many other sizes and shapes of the wormer device 100 are well within the scope of the present disclosure. Although the dimensions of the wormer device 100 are important design parameters for user convenience, the wormer device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of driving earthworms to a soil surface for collection, the method comprising the following steps:

providing a wormer device comprising a base component with a handle portion and a telescoping metal probe securable to the base component via a pin connection, wherein the base component comprises a vibrating motor powered by a battery and is configured to generate a plurality of vibrations along the metal probe, and wherein the handle portion comprises a plurality of indentations that conform to a shape of a user's fingers and a clamp configured to attach a flashlight to the handle portion so that the wormer device may be used during periods of low light or at night;

extending the metal probe to its full length and locking the metal probe in place via a slip lock;

turning the wormer device on, such that the wormer device generates vibrations along the metal probe;

inserting the metal probe into the ground; and collecting earthworms which are driven to the soil surface because of the plurality of vibrations.

\* \* \* \* \*